United States Patent
Woo et al.

(10) Patent No.: US 6,504,094 B2
(45) Date of Patent: Jan. 7, 2003

(54) MOUNTING APPARATUS FOR EQUIPMENT ENCLOSURES HAVING CABLE BEND RADIUS CONTROL AND CHANNEL FOR RETAINING CABLE

(75) Inventors: Raymond Woo, Ottawa (CA); Yoan Cecire, Kanata (CA); Nicholas A. Bundza, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/765,417

(22) Filed: Jan. 22, 2001

(65) Prior Publication Data

US 2002/0046862 A1 Apr. 25, 2002

(30) Foreign Application Priority Data

Jul. 12, 2000 (CA) .............................................. 2313895

(51) Int. Cl.[7] ................................................ H02G 3/08
(52) U.S. Cl. ......................... 174/50; 174/135; 174/58; 385/134
(58) Field of Search .............................. 174/50, 48, 49, 174/54, 53, 58, 60, 61, 63, 65 R, 68.1, 135; 385/134, 135; 361/823, 827, 644, 650, 655, 658, 730; 439/207, 208, 209; 220/3.2, 3.3, 3.8, 4.02, 4.01

(56) References Cited

U.S. PATENT DOCUMENTS

| | | | | |
|---|---|---|---|---|
| 5,129,030 A | * | 7/1992 | Petrunia ....................... 385/135 |
| 5,323,916 A | * | 6/1994 | Salmon ........................ 211/189 |
| 5,448,015 A | * | 9/1995 | Jamet et al. ................. 174/101 |
| 5,586,012 A | * | 12/1996 | Lerman ......................... 211/26 |
| 5,640,482 A | * | 6/1997 | Barry et al. ................. 385/134 |
| 5,715,348 A | * | 2/1998 | Falkenberg et al. ......... 385/135 |
| 5,758,002 A | * | 5/1998 | Walters ....................... 385/134 |
| 5,825,962 A | * | 10/1998 | Walters et al. .............. 385/135 |
| 5,918,837 A | * | 7/1999 | Vicain ......................... 174/135 |
| 5,975,315 A | * | 11/1999 | Jordan ......................... 211/189 |
| 6,006,925 A | * | 12/1999 | Sevier ......................... 211/189 |
| 6,102,214 A | * | 8/2000 | Mendoza ....................... 211/26 |
| 6,140,584 A | * | 10/2000 | Baldissara ................... 174/68.3 |
| 6,170,784 B1 | * | 1/2001 | MacDonald et al. .......... 211/26 |
| 6,181,862 B1 | * | 1/2001 | Noble et al. ................. 385/134 |
| 6,223,909 B1 | * | 5/2001 | Mendoza ....................... 211/26 |
| 6,250,816 B1 | * | 6/2001 | Johnston et al. ............ 385/135 |
| 6,256,444 B1 | * | 7/2001 | Bechamps et al. ........... 385/134 |
| 6,263,144 B1 | * | 7/2001 | Daoud ......................... 385/134 |
| 6,271,476 B1 | * | 8/2001 | Bobowick et al. ........... 174/135 |
| 6,318,680 B1 | * | 11/2001 | Benedict et al. ............ 174/68.1 |
| 6,321,017 B1 | * | 11/2001 | Janus et al. ................. 385/134 |
| 6,321,917 B1 | * | 11/2001 | Mendoza ....................... 211/26 |
| 6,347,714 B1 | * | 2/2002 | Fournier et al. .............. 211/26 |

* cited by examiner

*Primary Examiner*—Dean A. Reichard
*Assistant Examiner*—Angel R. Estrada
(74) *Attorney, Agent, or Firm*—Blake, Cassels & Graydon, LLP (57) ABSTRACT

There is provided an adapter for mounting electronic equipment, such as telecommunications switching equipment, to a rack. The adapter is configured to comply with industry standards, such as the Electronic Industries Association standards, that prescribe how electronic equipment should be mounted and installed. The adapter also protects and guides fiber optic cables connecting a communications network to electronic circuitry units which form part of the electronic equipment. In compliance with Bellcore standards, the adapter provides means for bend radius control which ensures that the fiber optic cable does not have a bend radius of less than one inch as it is dressed between the electronic circuitry units and the communications network. A cable cavity defined by the adapter is intended to minimize that fiber optic cable contained therein catches on the equipment and clothing of service personnel.

45 Claims, 3 Drawing Sheets

MOUNTING APPARATUS FOR EQUIPMENT ENCLOSURES HAVING CABLE BEND RADIUS CONTROL AND CHANNEL FOR RETAINING CABLE

FIELD OF THE INVENTION

The present invention relates generally to the field of equipment enclosures and more particularly, to an apparatus for mounting such equipment enclosures and for protecting cables which are connected to equipment housed therein. By way of example, the invention may be applied to the mounting of telecommunications equipment having fiber optic cables connected thereto.

BACKGROUND OF THE INVENTION

Electronic equipment conventionally comprises an enclosure such as a box-shaped housing containing electronic circuitry. In some instances, the front of such a housing is open so as to provide access to shelves, each of which may be configured with receiving stations for holding electronic circuitry units in a side-by-side relationship. Housings of this nature are prevalent in telecommunications equipment applications. When installed into such housings, one or more of these electronic circuitry units may be connected to a communications network using fiber optic cable. The fiber optic cable carries communication signals to and from the electronic equipment. Typically, each front vertical edge of the housing has a mounting flange that is generally perpendicular to the sides of the housing. The mounting flanges may be used to attach the equipment to a support structure therefor, such as vertical rack, as is well-known to those versed in this art. The rack has two parallel, vertical members which are spaced apart by a distance slightly greater than the width of the housing and each vertical member is typically secured to the floor. The vertical members each provide a mounting surface to which the mounting flanges of the equipment housing may be removably attached. In compliance with the Electronic Industries Association ("EIA") standards, set out in EIA document ANSI/EIA-310-D1992, rack members are typically spaced to correspond to standard housing widths. Standard widths used for housing are typically 19 inches, 23 inches, and 30 inches. (These standards are similar to those of the European Telecommunications Standards Institute ("ETSI"), as disclosed in ETSI document ETS 300 119-2.) Several racks may be lined up side by side and organized into parallel rows known in this art as equipment line-ups. Each row is separated from the other by a predetermined distance which provides access to the front and back of the electronic equipment so that the equipment may be serviced.

Alternatively, the mounting flanges may be secured to an adapter which is attached in turn to the vertical rack. The latter mounting arrangement is known to those skilled in the art as mid-mounting, and the adapter in question is termed a mid-mount adapter. Generally, the mid-mount adapter provides a web which is generally oriented perpendicular to the mounting flanges of the equipment housing. The mid-mount adapter thereby allows for the equipment in question to be mounted to the rack such that the front face or front surfaces of the equipment housing are spaced apart from the front surface of the rack. Thus, the vertically disposed mounting flanges of the equipment housing will be horizontally offset from the corresponding mounting surfaces therefor which are found on the rack.

Mid-mount adapters are employed for the rack mounting of electronic equipment in order to conform with ETA standards. Newton Instrument Company of Butner, N.C. manufactures a typical standards-compliant adapter (Newton part numbers 21386401 to 21386408) for mounting the housing to the rack. The Newton adapter comprises a planar metal web that is five inches wide, with parallel, symmetrical flanges traversing the longitudinal edges of the web. The cross-section of the adapter is generally U-shaped with the flanges being perpendicular to the plane of the web. The flanges are provided with a plurality of screw holes therethrough. The screw holes correspond to screw holes located in the mounting surface of each vertical member of the rack and in the mounting flanges of the equipment housing. Screws are inserted through the holes in the flanges of the adapter into the corresponding screw holes provided in the rack and in the flanges of the housing. The rack is thus located at or about the mid-section of each side of the housing. This mid-mounting arrangement provides service personnel with access to both the front and rear of the housing when the housing is arranged in equipment line-ups. A disadvantage of this arrangement is that the flange along the front vertical edge of the housing or that of the mid-mount adapter itself protrudes and may at times accidentally catch on equipment or clothing of repair personnel. It has also been known for repair personnel to collide with these protruding edges of the housing or adapter in certain prior art mid-mount adapters.

In a typical installation, the fiber optic cable protrudes from the front of the housing at or near its point of connection with the electronic circuitry unit. The protruding cable hangs vertically over a portion of the front surface of the housing. In a lower portion of the housing, the cable is partially wrapped around a protrusion in the front surface of the housing, as is known to those in this art. The protrusion has a curved surface which the cable follows, causing the cable to be drawn horizontally across the front surface of the housing. At the point at which the cable reaches a vertical edge of the housing, the cable is partially wrapped around the mounting flange and is run either up the side of the housing into a ceiling or down the side of the housing into a sub-floor cable raceway system.

When certain of the known mid-mount adapters are deployed in the foregoing installations, the cables will typically be exposed to potential damage or mechanical disruption at the sides and front of the equipment housing. Moreover, these unprotected cables may hang loosely from the front of the housing. In this arrangement the cable is often caught on the clothing and equipment of maintenance personnel when they service the electronic equipment contained within the housing. When the cable catches, it may also disconnect, which may lead to increased maintenance costs. If slack in the cable is reduced, problems may also arise because the cable must then be wrapped tightly around the mounting flange of the equipment housing or adapter flange. This causes the cable to bend unduly, often forming a bend radius of less than one inch. If the fiber optic cable is bent with a radius of less than one inch then a Bellcore industry standard for bend radius pertaining to fiber optic cable is not satisfied. This standard, set out in Bellcore Generic Requirements document GR-78-Core, at paragraph R5-34[170], states that "[s]ingle optical fiber cables shall not be bent to a radius of less than one inch at any stage during manufacturing or field deployment." A bend radius of less than one inch in the cable may cause fiber fracture which causes a loss of the signal being carried by the cable. If fiber fracture occurs, the cable must be replaced. Users of the communication signal carried by the damaged cable also may lose revenue for the time that they are unable to use the fiber optic cable.

In other known installations, the cable is guided alongside the equipment housing by an extruded plastic three-sided conduit, or cable management system, with a rectangular cross-section. The conduit's opposing sides are formed by a plurality of narrow resilient fingers. The remaining side is comprised of a continuous web. The resilient fingers protrude in the same direction from the longitudinal edges of the web and are perpendicular to the web. The conduit is vertically attached to the rack and the cable is wrapped between two or more narrow fingers to hold it in place as it traverses the conduit into either the ceiling or sub-floor, as previously described. The cable system may alternatively be configured to have a second three-sided conduit. In this alternative configuration, a second set of resilient fingers protrude perpendicularly from the longitudinal edges of the web but in the opposite direction of the first resilient fingers. This two channel arrangement has an H-shaped cross-section. An example of this cable management system is the Fiber-Duct™ FMPVS manufactured by Panduit Corporation of Tindley Park, Ill. A conventional conduit typically only serves the function of routing cable; it can not generally be used to mount electronic equipment to a rack.

While the cable management systems of the type described above may secure or protect cables from damage or disruption when same are running alongside the equipment housing, in certain of such cable management systems the cables in question may nevertheless still exhibit the tendency to hang loosely from the front of the equipment housing. Thus, the very same problems associated with loose cables might be encountered with the foregoing cable management systems when compared to installations deploying known mid-mount adapters. Likewise, if it is sought to reduce cable slack at the front of the equipment housing, certain of the said cable management systems may produce an undesirable bend radius due to the cable being wrapped tightly around the mounting flange of the equipment housing or around the mid-mount adapter flange. This problem was previously explained in relation to known mid-mount adapters.

Based on the foregoing, it would be desirable to develop alternative means for mid-mounting electronic equipment and for routing cable connections thereto while attempting to alleviate or minimize excessive bending or other mechanical disruption of the cables.

SUMMARY OF THE INVENTION

The invention consists of an apparatus for mounting an equipment enclosure to a support structure. The support structure has a first and a second mounting surface, which are generally coplanar and spaced apart to accommodate positioning of at least a portion of the equipment enclosure therebetween. The equipment enclosure is for housing equipment which is connectable to at least one signal carrying cable. According to one broad aspect of the invention, the apparatus comprises:

a) a first abutting member for attachment of said apparatus to one of said first and second mounting surfaces of the support structure;

b) a second abutting member spaced apart from said first abutting member and providing a third mounting surface for attachment to said equipment;

c) at least one bridging member connecting said first abutting member to said second abutting member;

d) at least one cable retaining member, each cable retaining member depending from one of said first abutting member and said second abutting member, to thereby form a cable cavity which is generally defined by said first abutting member, by said second abutting member, by each said bridging member and by each said cable retaining member, an d into which said at least one signal carrying cable is locatable; and wherein the first abutting member, the second abutting member, each bridging member and each cable retaining member are oriented such that an opening is provided between said first and second abutting members through which said at least one signal carrying cable may be introduced therethrough and into said cable cavity in a direction generally transverse to a longitudinal axis of said at least one signal carrying cable.

According to another broad aspect of the invention, there is provided a bend radius control apparatus for the signal carrying cable. The signal carrying cable is connectable to equipment housed in an enclosure therefor. The enclosure has an edge around which the cable is to be redirected as to its orientation. The bend radius control apparatus comprises an elongate member having a generally U-shaped cross-sectional configuration with free terminal ends and an apex portion located therebetween. The apex portion presents a predetermined radius of curvature. The signal carrying cable, when said elongate member is attached adjacent said edge of the enclosure, contacts said elongate member instead of said edge at the apex portion of the member to thereby cause redirection of the orientation of the signal carrying cable while maintaining the signal carrying cable at a bend radius which is no less than said predetermined radius of curvature.

In an illustrative embodiment of the present invention the mounting apparatus may additionally comprise the bend radius control apparatus.

With respect to further illustrative embodiments of the present invention, the bridging member of the mounting apparatus may be a web and the at least one cable retaining member thereof may be a tongue. The web may have a longitudinal first edge and a longitudinal second edge, wherein the first abutting member of the mounting apparatus depends from the web adjacent the longitudinal first edge and the second abutting member of the mounting apparatus depends from the web adjacent the longitudinal second edge. The second abutting member and first abutting member both may depend generally in the same direction away from the web. The tongue may protrude from a free longitudinal edge of the second abutting member, and may extend towards the first abutting member.

With respect to yet further illustrative embodiments of the present invention, the apex portion of the bend radius control apparatus may be parallel to a longitudinal axis of the web of the mounting apparatus. A free terminal end of the elongate member of the bend radius control apparatus may be attached to the web so that the second abutting member is interposed between the free terminal ends of the elongate member to thereby define a surface which overlaps the second abutting member of the mounting apparatus.

BRIEF DESCRIPTION OF THE DRAWINGS

For a better understanding of the present invention and to show more clearly how it may be carried into effect, reference is now made, by way of example and not of limitation, to the accompanying drawings in which.

DETAILED DESCRIPTION OF ILLUSTRATIVE EMBODIMENTS OF THE INVENTION

Figures 1, 1A:
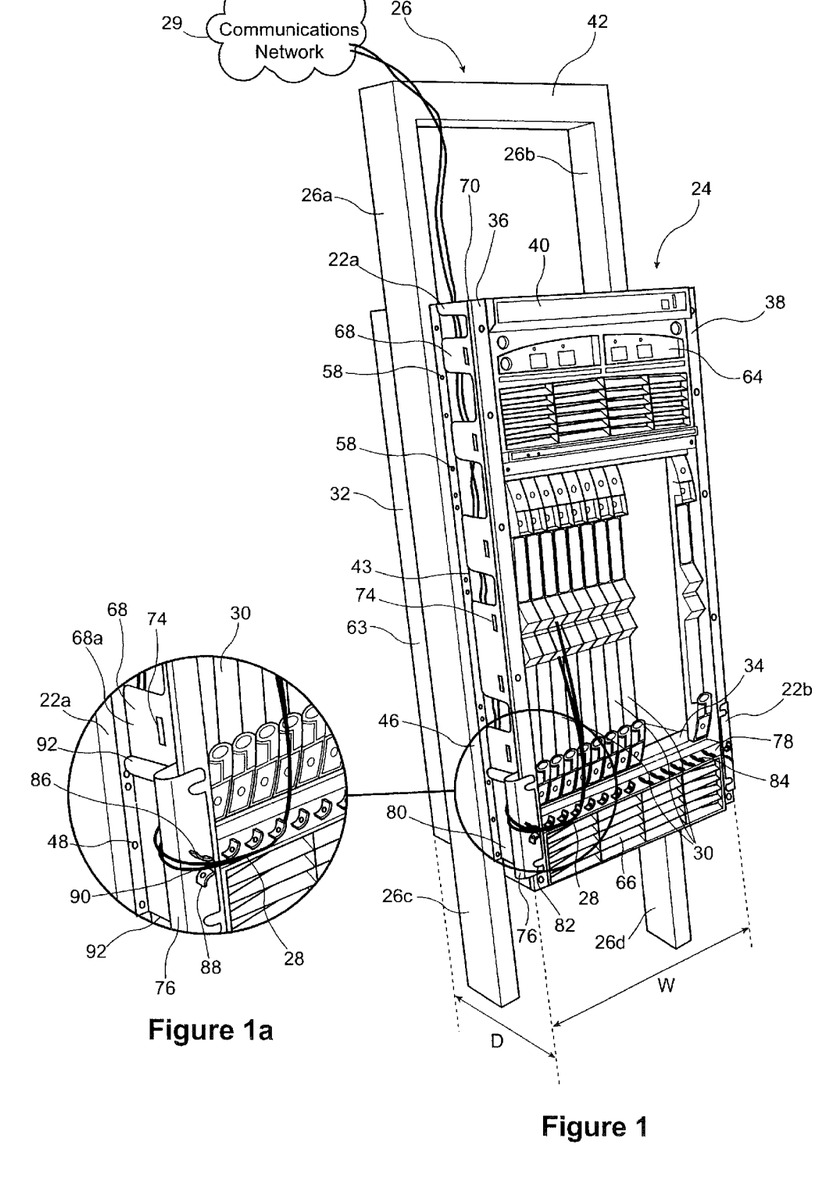
FIG. 1 is a perspective view of a typical installation of an adapter according to an illustrative embodiment of the invention, showing a face panel of telecommunications equipment to which the adapter is attached.
FIG. 1A is a detailed perspective view of the adapter of FIG. 1, showing a bend radius manager thereof.
Figure 2:
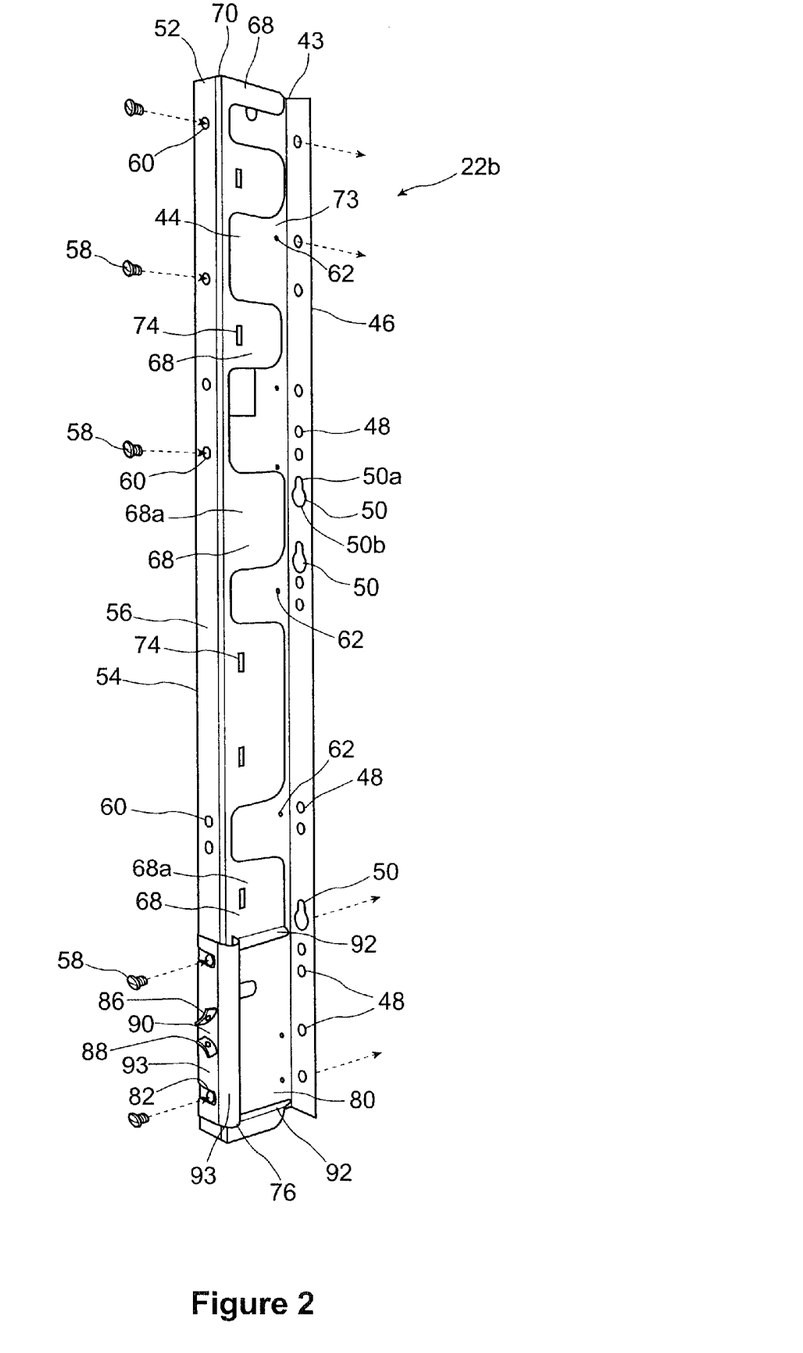
FIG. 2 is a perspective view of the adapter of FIG. 1.
Figure 3:
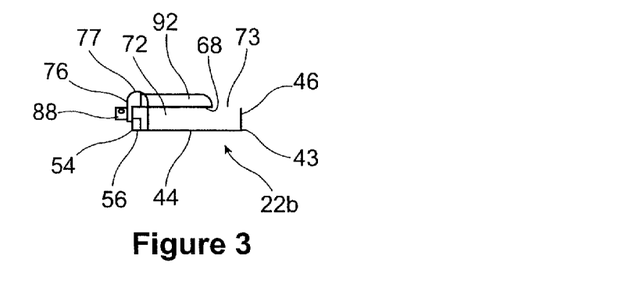
FIG. 3 is a longitudinal end view of the adapter of FIG. 1.
Figure 4:
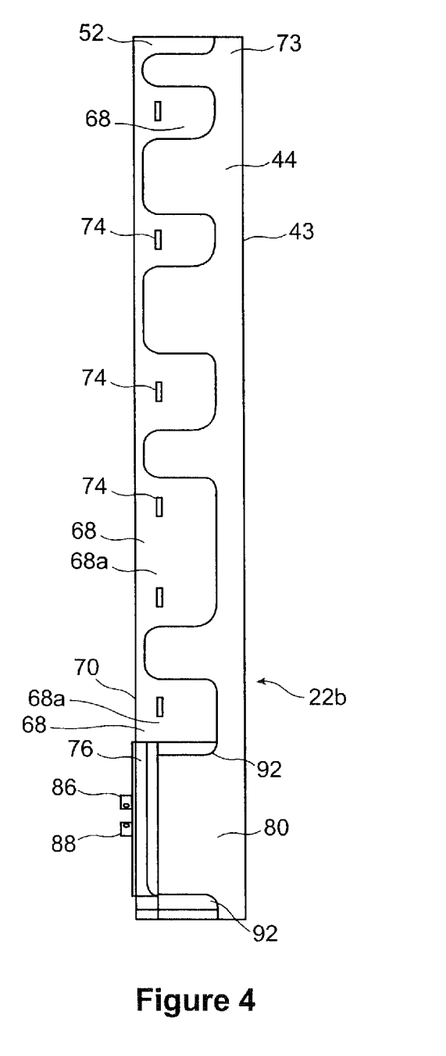
FIG. 4 is a side view of the adapter of FIG. 1.
Figure 5:
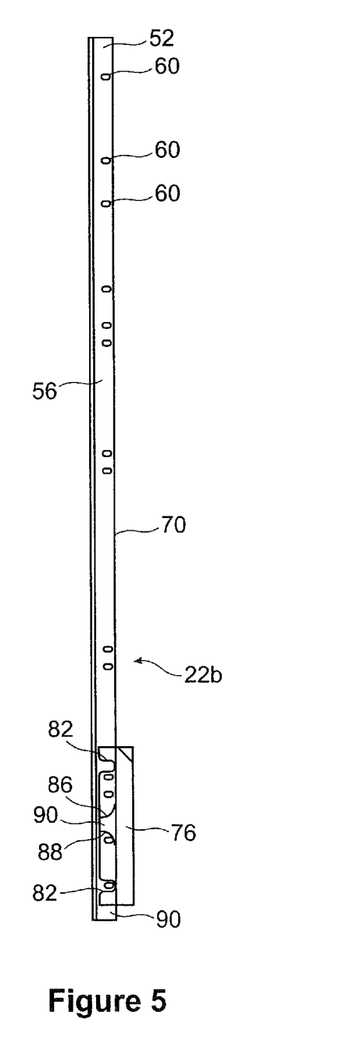
FIG. 5 is another side view of the adapter of FIG. 1, viewed from a direction transverse to the side view of FIG. 4.

Referring to FIG. 1, a mounting implement in the form of an adapter 22a is used to mount equipment, such as telecommunications switching equipment 24, to a support structure such as a rack 26. In the illustrative embodiment, the adapter 22a is a mid-mount adapter. The adapter 22a also guides cable, for example signal carrying cable, which is connected to the electronic equipment 24. In an illustrative embodiment of the invention the cable is fiber optic cable 28 which connects a communications network 29 to plug-in electronic circuitry units 30 which form part of the electronic equipment 24. In a typical installation, a second adapter 22b, which mirrors the first adapter 22a in configuration, is used.

The electronic equipment 24 comprises an equipment enclosure which may be in the form of a box-shaped housing 32. The housing 32 may be used to house equipment such as the electronic circuitry units 30. A portion of the housing 32 is open providing access to one or more shelves 34, each of which holds the electronic circuitry units 30 in a side-by-side relationship. When installed into the housing 32, one or more of the electronic circuitry units 30 may be connected to a communications network using the fiber optic cable 28. The fiber optic cable 28 carries communication signals between the electronic equipment 24 and the communications network.

Each of a pair of flanges 36, 38 extends adjacent the respective vertical edges of the housing 32 which are adjacent face panel 40 thereof. Each flange 36, 38 is therefore substantially coplanar with the face panel 40 of the housing 32 and extends from the exterior surface of the housing 32. The flanges 36, 38 may ordinarily be used to attach the housing directly to corresponding generally coplanar first and second mounting surfaces, such as provided by portions of the front surface 42 of the rack 26. The rack 26 has two parallel, vertical members 26a and 26b which are spaced apart by a distance slightly greater than the width W of the housing. In compliance with EIA standards for telecommunications equipment, this distance is typically 19 inches, 23 inches or 30 inches, which measures are dependant on the respective corresponding width of the housing 32. Each vertical member 26a, 26b is secured at one end 26c, 26d thereof to the floor.

Several racks may be lined up side by side and organized into parallel rows, also called equipment line-ups (not shown). Each row is a separated from the other by a predetermined distance which provides access to the electronic equipment 24 so that the equipment 24 may be serviced.

To comply with EIA standards, the housing 12 is mounted to the rack 26 using the adapters 22a, 22b. When mounted, the face panel 40 of the housing 32 is horizontally displaced to extend outwardly of the rack 26 by five inches from the front surface 42 thereof, such that the rack 26 is located at or near the mid-point of the depth D of the housing 32 and a portion of the housing 32 is positioned between the vertical members 26a and 26b. This mid-mounting arrangement provides service personnel with access to those areas of the housing 32 which are adjacent the face panel 40, while retaining access to areas of the housing 32 which are generally opposite to face panel 40, when the housing 32 is arranged in equipment line-ups.

Referring now to FIGS. 2 through 5, which show various views of an illustrative embodiment of the present invention, the adapter 22a, 22b comprises at least one bridging member, such as a web 44. The web 44 is generally planar and rectangular in shape. Along the length of one of its longitudinal edges 43, the web 44 has a first abutting member, for instance a 5 flange 46, which is perpendicular to the plane of the web 44. The first flange 46 is used for mounting the adapter 22a, 22b to one of the vertical members 26a, 26b of the rack 26. The adapter 22a, 22b is mounted to the rack 26 by using one or more appropriate fasteners such as screws or the like (not shown) inserted through corresponding apertures 48 provided in the flange 46. Once inserted through the respective apertures 48, the screws may engage with a corresponding threaded receptacle in the rack 26 (not shown). To secure the adapter 22a, 22b to the rack 26, the screws passing through the apertures 48 are tightened. When the adapter 22a, 22b is used in conjunction with a rack 26 whose vertical members 26a, 26b are 23 inches apart, the adapter 22a, 22b may be configured with a wider first flange 46 than when the adapter 22a, 22b is used in conjunction with a rack 26 whose vertical members 26a, 26b are 19 inches apart. In the illustrative embodiment, the first flange 46 has ten apertures 48 located along the longitudinal length thereof. The apertures may be arranged as mandated by industry standards such as the EIA or ETSI standards. In the illustrative embodiment, ten #12–24 machine screws are inserted through the apertures 48 into the rack 26 and tightened to secure the adapter 22a, 22b thereto.

To facilitate the mounting of electronic equipment 24 to the rack 26, the first flange 46 also has at least one key-shaped aperture 50 therethrough. The key-shaped aperture 50 is located along the longitudinal length of the first flange 46, with the narrow end 50a of the key-shaped aperture 50 pointing towards one terminal end 52 of the adapter 50. The key-shaped aperture 50 permits the adapter 22a, 22b to be pre-mounted onto a locating pin such as a screw (not shown) partially threaded into the rack 26. The screw head of the partially installed screw is inserted through the wide end 50b of the key-shaped hole 50. The adapter 22a, 22b is then lowered so that the shaft of the screw is retained in the narrow end of the key-shaped hole 50a. The screw head thus holds the adapter 22a, 22b in place because the screw head is larger than the narrow end of the key-shaped hole 50a. Other types of locating pins or like mechanisms will be apparent to those skilled in this art. The remaining screws 48 are installed with the adapter 22a, 22b conveniently and temporarily held in place by the key-shaped hole and screw arrangement. In the illustrative embodiment, four key-shaped holes 50 are provided in the first flange 46 and are located along the longitudinal length of the rear flange 50. Mounting the electronic equipment 24 to the adapter 22a, 22b is described in greater detail below.

Along the length of its other longitudinal edge 54, the web 44 has a second abutting member, for instance a flange 56, which is perpendicular to the plane of the web 44, extends in the same direction as the first flange 46 and is parallel thereto. The second flange 56 provides a third mounting surface which is used for mounting the adapter 22a, 22b to one of the vertical flanges 36, 38 of the housing 32. The adapter 22a, 22b is mounted to the housing 32 using at least one or more appropriate fasteners such as screws 58 or the like inserted through corresponding threaded apertures 60 provided in the second flange 56. The flanges 36, 38 of housing 32 have apertures (not shown) that correspond in size and location to the apertures 60 of the second flange 56 of adapter 22a, 22b. Once the screws 58 are inserted through the corresponding apertures of the flanges 36, 38, each screw 58 engages with the corresponding hole 60 in the second flange 56. To secure the housing 32 to the adapter 22a, 22b, the screws 58 are tightened. In the illustrative embodiment, the second flange 56 has seven apertures 60 located along its longitudinal length. These seven apertures 60 correspond to seven apertures (not shown) in each of flanges 36, 38 of the housing 32. In the preferred embodiment, seven #10–32 Sems screws are inserted through the apertures in the flange 36,38 and corresponding threaded apertures 60, and tightened to secure the housing 32 to the adapter 22a, 22b.

The web 44 itself is provided with one or more, for instance eleven, screw holes 62 therethrough. The screw holes 62 may be aligned along an axis parallel to the longitudinal axis of the web 44. The screw holes 62 correspond to apertures (not shown) in the side 63 of the housing unit 32. Of the eleven screw holes 62, five correspond to the location of the electronic circuitry units 30; four correspond to the location of the power and cooling unit 64 contained within the housing 32; and two correspond to the location of the exhaust unit 66 of the housing 32. In the preferred embodiment, #10–32 Sems screws are used. Five of the screws may be inserted from the inside of the housing 32 through the apertures that correspond to the location of the electronic circuitry units 30. These five screws are then fastened to the adapter 22a, 22b using the corresponding five screw holes 62 in the web 44. The remaining six screws may be inserted in the opposite direction: first through the screw holes 62 in the web 44 and then through the corresponding apertures in the side of the housing 32.

The adapter 22a, 22b provides a cable guide for retaining cable which is connected to equipment 24. The adapter is suited for the retention of cable such as fiber optic cable in the nature of cable 28, but those skilled in this art will understand that other types of cable may be retained by means of the present invention as well. According to an illustrative embodiment, the second flange 56 may be provided with at least one cable retaining member, for instance a tongue 68, for retaining fiber optic cables 28. In an illustrative embodiment, six tongues 68 may be provided. The tongues 68 extend from the free or distal edge 70 of the second flange 56, are generally parallel to the web 44 and are generally perpendicular to the first and second flanges 46, 56. The tongues 68 extend towards but do not reach the first flange 46. A cable cavity 72 is thus formed by the web 44, the first and second flanges 46, 56 and the tongues 68 (see FIG. 3). In an alternative embodiment, the tongues 68 may be configured to instead extend from the free edge of the first flange 46 towards the second flange 56.

In the illustrative embodiment, the tongues 68 are sufficiently wide that they do not catch on the clothing and equipment of repair personnel. The cable cavity 72 beneficially makes use of space that is unused in conventional arrangements. Since the adapter 22a, 22b according to the illustrative embodiment substantially fills the space formed between the first and second flanges 46, 56 thereof, each of the flanges 36, 38 of housing 32 does not protrude laterally in a manner so as to present as extensive an exposed leading edge on either side of housing 32 as is the case with certain prior art mid-mount adapters. Thus, the flanges 36, 38 of housing 32 of the illustrative embodiment should be less prone to catch on equipment and clothing of repair personnel, when compared to certain of the prior art mid-mount adapters.

When the adapter 22a, 22b is installed, fiber optic cables 28 are dressed through the cable cavity 72 and are retained therein and protected to some degree from mechanical disruption by the tongues 68, first and second flanges 46, 56 and the web 44. The tongues 68, first and second flanges 46, 56, and the web 44 are oriented such that an opening 73 is provided between the first and second flanges 46, 56, through which at least one fiber optic cable 28 may be introduced therethrough and into the cable cavity 72 in a direction generally transverse to a longitudinal axis of the at least one fiber optic cable 28. Unlike certain traditional cable management systems, the cables 28 are not bent or wound around the tongues 68. However, for better retention by the adapter 22a, 22b, the cables 28 may be tied with cable ties known in the art (not shown) and secured to the adapter 22a, 22b through cable tie holes 74 provided in the tongues 68. This arrangement minimizes the number of bends in the cable 28 and should tend to minimize that the cable 28 catches on the clothing or equipment of service personnel.

To facilitate compliance with Bellcore standard R5-34 [170] from Generic Requirements document GR-78-CORE as previously referred to, a bend radius control apparatus comprising a bend radius control member 76, discourages fiber optic cable 28 from forming a bend radius of less than one inch as the fiber optic cable 28 enters the cable cavity 72. The bend radius control member 76 comprises an elongate member having a generally U-shaped cross-section 77 with free terminal ends and an apex portion located therebetween, the apex portion presenting a predetermined radius of curvature (see FIGS. 1A and 3). In an illustrative embodiment the radius of the apex portion is at least one inch. The elongate member may be formed from a generally rectangular shaped web that is bent to form a U-shaped channel which has a U-shaped cross-section 77. The apex portion so formed as aforesaid follows the longitudinal axis of the bend radius control member 76. The bend radius control member 76 may be configured so that it is sufficiently long to guide a plurality of fiber optic cables 28 aligned in a side-by-side relationship. In the illustrative embodiment, the bend radius control member 76 is significantly shorter than the adapter 22a, 22b. Those skilled in this art will understand that any desired length of radius control member 76 may be adapted for use with the adapter 22a, 22b or other mid-mount adapter structures.

When attaching the bend radius control member 76 to the adapter 22a, 22b, the second flange 56 of adapter 22a, 22b is interposed, as best illustrated in FIG. 1A, between the arms of the U-shaped channel of the bend radius control member 76 until a longitudinal edge of the bend radius control member 76 comes into contact with the surface of the web 44. This edge is then attached to the web 44 at the point of contact therewith. Spot welding may be used to attach the bend radius control member 76 to the web 44. Other methods of attachment for the bend radius control member 76 will be apparent to those skilled in this art. The bend radius control member 76 may be located adjacent a terminal longitudinal end 80 of the adapter 22a, 22b, but other locations of attachment will be apparent to those skilled in this art.

When the adapter 22a, 22b is installed (as described in greater detail below), the bend radius control member 76 is positioned adjacent to and at an end of a horizontal trough 78. The horizontal trough 78 is attached to the front face 40 of the housing 32. The horizontal trough 78 is used to support and direct the fiber optic cable 28 as it traverses the horizontal distance between the electronic circuitry unit 30, to which the cable 28 is attached, and either the left flange 36 or the right flange 38 of the housing 32, as the case may be. In the illustrated embodiment, wherein the bend radius control member 76 is formed from a channel-shaped member, the bend radius control member 76 is disposed generally perpendicular to the trough 78.

Once the adapter 22a, 22b is installed, the free or distal end of the bend radius control member 76 overlaps, but is not connected to, a portion of either the left flange 36 or right flange 38, depending on which side of the housing 32 the adapter 22a, 22b is installed. At least one rebate 82 may be provided in the portion of the free end of the bend radius control member 76 that overlaps with the flange 36 or 38. The rebate 82 provides access to the screws 58 and corresponding apertures 60, which secure the housing 32 to the adapter 22a, 22b in the vicinity of radius control member 76.

Referring to FIGS. 1 and 1A, the fiber optic cable 28 protrudes from the front face 40 of the housing 32 at or near its point of connection with the electronic circuitry unit 30. The fiber optic cable 28 typically hangs generally vertically over a portion of the front face 40 of the housing. In the lower portion of the housing, the cable 28 may be partially wrapped around a protrusion 84 or other like cable guide means provided in the front face 40. The protrusion 84 has a curved surface which the cable 28 follows, causing the cable to be drawn horizontally across the front 40 of the housing 32. As the cable 28 is drawn horizontally, it is supported by the trough 78. At the point at which the cable 28 reaches a flange 36 or 38 of the housing, the cable 28 contacts and is wrapped around the bend radius control member 76 and is dressed into the cable cavity 72, thereby causing redirection of the orientation of the cable 28 while maintaining the cable 28 at a bend radius that is no less than the predetermined radius of curvature.

Two guides 86, 88 protrude from a portion of the surface of the bend radius control member 76 that overlaps one of the flanges 36 or 38 (depending on which side of the housing 32 the adapter 22a, 22b is installed). Each guide 86, 88 may have a convex flat curved surface that is generally perpendicular to the plane of the front face 40 of the housing 32. The curved surface of each guide 86, 88 forms a 90 degree arc with a radius of at least one inch. The guides 86, 88 are oriented in mirror relationship to one another with the convex curved surfaces thereof facing each other, thereby defining boundaries of a horizontal channel 90 for the fiber optic cable 28. The channel 90 is narrower at the point that the cable 28 exits the horizontal trough 78 and enters the channel 90; and the channel 90 is wider at the at the point where the cable 28 exits the channel 90 and meets the rounded portion of the bend radius control member 76. As the cable 28 enters the cable cavity 72 it is drawn either upwards into a ceiling or downwards into a sub-floor. If the cable 28 is drawn upwards it is first guided by the first guide 86 which guides the cable 28 from a horizontal orientation to a vertical orientation. The cable 28 is then guided by the rounded surface of the bend radius control member 76 from an orientation which is parallel to the front face 40 of the housing 32, to an orientation which is parallel with the plane of the web 44. Similarly, if the cable 28 is drawn downwards, it is guided by the second guide 88 and by the rounded surface of the bend radius control member 76. All guides 76, 86, 88 have a radius of at least one inch. This arrangement is intended to avoid fiber fracture by ensuring that the cable 28 never forms a bend radius of less than one inch as it is drawn from the horizontal trough 78 into the cable cavity 72.

The tongues 68 each have a planar portion 68a. The edges of the tongues 68 adjacent to the bend radius control member 76 each have an angled flange 92 which extends away from the web 44 at an obtuse angle with respect to the planar portion 68a. The angled flanges 92 provide a visual cue to those installing fiber optic cable 28 that the cable 28 should be dressed into the cable cavity 72 and under the tongue 68 with the angular flange 92. The angular flanges 92 also ensure that the fiber optic cable 28 is not damaged by the edge of the tongue 68 as it enters the cable cavity 72.

As the above description illustrates, the adapter 22a, 22b advantageously provides a means for mounting electronic equipment 24 to a rack 26; it provides bend radius control so that the fiber optic cable 28 does have a bend radius of less than one inch; and it provides a cable cavity 72 for dressing fiber optic cable 28 between the electronic equipment 24 and a communications network 29.

The preferred steps to complete a typical installation of the adapter 22a, 22b are now described. In a typical installation, a first adapter 22a and a second adapter 22b, shown in FIG. 1, which mirror each other in configuration, are used. The first adapter 22a is attached by its second flange 56 to the left flange 36 of housing 32 and the second adapter 22b is attached by its second flange 56 to the right flange 38 of the housing 32. Each adapter 22a, 22b is installed with the outermost surfaces 93 of the bend radius control member 76 overlapping a portion of either the left flange 36 or right flange 38, depending on which side of the housing 32 the adapter 22a, 22b is installed. As described above, screws 58 may be used to secure the second flange 56 to the flange 36, 38 of the housing 32 and to secure the web 44 to the housing 32. Once the adapters 36, 38 are attached to the housing 32, screws are partially screwed into the rack 26. The location of the screws corresponds to the location of the key-shaped holes 50 in the first flange 46 of the adapters 22a, 22b. The adapters 22a, 22b and housing 32 are lifted, and the heads of the screws partially screwed into the rack 26 are inserted into the wide end 50b of the key-shaped holes 50. The adapters 22a, 22b and housing 32 are lowered so that the shaft of the partially inserted screw is retained in the narrow end of the key-shaped hole 50a. The screw head thus holds the adapters 22a, 22b in place because the screw head is larger than the narrow end of the key-shaped hole 50a. The remaining screws 48 are installed with the adapter 22a, 22b and housing 32 conveniently held in place by the key-shaped hole 50 and screw arrangement. Once the screws 48 are all installed, the screws in the key-shaped holes 50 may either be tightened or removed.

The adapter 22a, 22b may be made of a single piece of material, such as sheet steel, from which the adapter 22a, 22b may be stamped and then bent into the form described above. The bend radius control member 76 may also be stamped from a separate piece of material, for instance sheet steel, bent into the required shape, and then attached to the web 44, for example by spot welding. Alternatively, the entire adapter 22a, 22b, including the bend radius control member 76, may be stamped from a single piece of material. In this configuration, the bend radius control member 76 is formed from an elongated portion of the second flange 56 of the adapter 22a, 22b. Once the stamped piece is bent to form the flanges 46, 56 and the tongues 68, the elongated portion is bent to form an arcuate member that is concave to the web 44. The arcuate member is the bend radius control member 76 and it performs substantially the same function as described above for the bend radius control member 76. The adapter 22a, 22b is thus integrally formed from a single piece of material. The adapter 22a, 22b may also be constructed as an integrally formed unit by extrusion or injection molding, as is known to those skilled in the art. The steel or other material used for the construction of adapter 22a, 22b should be of sufficient thickness to withstand, without deformation, the load placed on it by the electronic equipment 24. Adapters 22a, 22b may alternatively be made of other materials, such as plastics, having suitable properties.

Although the above description has been made with reference to equipment in the nature of telecommunications switching equipment, those skilled in the art will appreciate that other types of equipment may be used in conjunction with an embodiment of the invention. Similarly, it will be appreciated by those skilled in the art that other types of signal carrying cable, such as hydraulic or pneumatic cable, may be implemented.

It will be understood by those skilled in the art that this description is made with reference to the illustrative embodiments and that it is possible to make other embodiments employing the principles of the invention which fall within its spirit and scope thereof.

What is claimed is:

1. An apparatus for mounting an equipment enclosure to a support structure therefor, and the support structure defines a first and a second mounting surface, the first and second mounting surfaces being generally coplanar and being spaced apart to accommodate positioning of at least a portion of said equipment enclosure therebetween, wherein the said equipment enclosure is for housing equipment which is connectable to at least one signal carrying cable, the said apparatus comprising:
   a) a first abutting member for attachment of said apparatus to one of said first and second mounting surfaces of the support structure;
   b) a second abutting member spaced apart from said first abutting member and providing a third mounting surface for attachment to said equipment enclosure;
   c) at least one bridging member connecting said first abutting member to said second abutting member to define a gap therebetween, such that when the first abutting member is attached to one of the first and second mounting surfaces of the support structure and when the equipment enclosure is attached to the third mounting surface of the second abutting member, the equipment enclosure is spaced apart from the support structure by a distance equal to said gap.
   d) at least one cable retaining member, each cable retaining member depending from one of said first abutting member and said second abutting member, to thereby form a cable cavity which is generally defined by said first abutting member, by said second abutting member, by each said bridging member and by each said cable retaining member, and into which said at least one signal carrying cable is locatable; and
   wherein the first abutting member, the second abutting member, each bridging member and each cable retaining member are oriented such that an opening is provided between said first and second abutting members through which said at least one signal carrying cable may be introduced therethrough and into said cable cavity in a direction generally transverse to a longitudinal axis of said at least one signal carrying cable.

2. The apparatus as claimed in claim 1, wherein the bridging member is a web.

3. The apparatus as claimed in claim 2, wherein each cable retaining member is a tongue.

4. The apparatus as claimed in claim 3, wherein:
   the web has a longitudinal first edge and a longitudinal second edge;
   said first abutting member depends from the web adjacent the longitudinal first edge thereof;
   said second abutting member depends from the web adjacent the longitudinal second edge thereof, wherein said first and second abutting members depend generally in the same direction away from said web; and
   each tongue protrudes from a free longitudinal edge of the second abutting member, and extends towards the first abutting member.

5. The apparatus as claimed in claim 4, wherein the first abutting member and second abutting member both depend from the web in a direction substantially perpendicular thereto and wherein each tongue protrudes from said free longitudinal edge of the second abutting member in a direction generally perpendicular thereto.

6. The apparatus as claimed in claim 5, wherein the first and second abutting members each have at least one aperture therein for receiving a fastener for attachment of the first abutting member to one of the first and second mounting surfaces of the support structure and for attachment of the second abutting member to the equipment at the third mounting surface of the second abutting member.

7. The apparatus as claimed in claim 6, wherein the web is of a generally planar shape.

8. The apparatus as claimed in claim 7, wherein the first and second abutting members are flanges.

9. The apparatus as claimed in claim 8, wherein the apparatus has at least six tongues.

10. The apparatus as claimed in claim 9, wherein each tongue has at least one aperture therein for securing signal carrying cable thereto.

11. The apparatus as claimed in claim 10, further comprising a bend radius control member for the signal carrying cable, and wherein the enclosure further provides an edge thereof around which said cable is to be redirected as to its orientation, the bend radius control member being elongate and having a generally U-shaped cross-sectional configuration with free terminal ends and an apex portion located therebetween, the apex portion presenting a predetermined radius of curvature; and wherein the signal carrying cable, when said bend radius control member is attached adjacent said edge of the enclosure, contacts said bend radius control member instead of said edge at the apex portion of the bend radius control member to thereby cause redirection of the orientation of the signal carrying cable while maintaining the signal carrying cable at a bend radius which is no less than said predetermined radius of curvature.

12. The apparatus as claimed in claim 11, wherein the apex portion of the bend radius control member is parallel to a longitudinal axis of the web, and a free terminal end of the bend radius control member is attached to the web so that the second abutting member is interposed between the free terminal ends of the bend radius control member to thereby define a surface which overlaps the second abutting member.

13. The apparatus as claimed in claim 12, wherein the predetermined radius of curvature is at least one inch.

14. The apparatus as claimed in claim 11, further comprising two guides, each said guide protruding from the surface of the bend radius control member which overlaps the second abutting member, each said guide protruding in a direction away from said first abutting member, the guides having a convex curved surface that is perpendicular to the second abutting member, the convex curved surface forming at least a 90 degree arc with a radius of at least one inch, the guides being oriented in mirror relationship to one another with the convex curved surfaces thereof facing each other, the guides thereby defining boundaries of a horizontal channel for the signal carrying cable when same is placed therebetween, the channel being wider at a point where the signal carrying cable exits the horizontal channel adjacent the apex portion of the bend radius control member.

15. The apparatus as claimed in claim 14, wherein the first abutting member has a key-shaped aperture therein.

16. The apparatus as claimed in claim 15, wherein the apparatus is constructed from sheet metal.

17. The apparatus as claimed in claim 15, wherein the apparatus is constructed from a plastic.

18. The apparatus as claimed in claim 16, wherein the web is uniformly five inches wide.

19. The apparatus as claimed in claim 15, wherein the tongues have a planar portion; and one of said tongues is disposed adjacent the bend radius control member, and an edge of said one of said tongues which is proximate to said bend radius control member has an angled flange which extends away from the web at an obtuse angle with respect to said planar portion.

20. The apparatus as claimed in claim 18, wherein the equipment enclosure is a box-shaped housing, the support structure is a rack, the equipment is telecommunications equipment and the signal carrying cable is a fiber optic cable.

21. The apparatus as claimed in claim 20, wherein the apex portion of the bend radius control member is of a length that is less than that of the apparatus.

22. The apparatus as claimed in claim 21, wherein the free terminal end of the bend radius control member that overlaps the second abutting member has at least one rebate therein, said at least one rebate providing access to one of said at least one aperture of the second abutting member.

23. The apparatus as claimed in claim 1, further comprising:

an arcuate surface located adjacent said cable cavity, the arcuate surface presenting a predetermined radius of curvature such that when the signal carrying cable contacts the arcuate surface and is directed into said cavity, the arcuate surface maintains the signal carrying cable at a bend radius which is no less than said predetermined radius of curvature.

24. The apparatus as claimed in claim 23, wherein the second abutting member is a flange and the arcuate surface is provided at a free terminal edge of the flange.

25. The apparatus as claimed in claim 24, wherein the arcuate surface is of a length along the said free terminal edge of the flange that is less than that of the apparatus.

26. The apparatus as claimed in claim 25, wherein the arcuate surface extends from the said free terminal edge of the flange and curves towards said bridging member to abut against same.

27. The apparatus as claimed in claim 26, further comprising two guides, the two guides being located on and protruding from the said flange in a direction away from said first abutting member, the guides each having a convex curved surface that is perpendicular to said flange, the convex curved surface forming at least a 90 degree arc with a radius of at least one inch, the guides being oriented in mirror relationship to one another with the convex curved surfaces thereof facing each other, the guides thereby defining boundaries of a horizontal channel for the signal carrying cable when same is placed therebetween, the channel being wider at a point where the signal carrying cable exits the horizontal channel adjacent the arcuate surface.

28. The apparatus as claimed in claim 26, wherein one of said cable retaining members is disposed adjacent the said arcuate surface, and an edge of said one of said cable retaining members proximate to said arcuate surface has an angled flange which extends away from said bridging member.

29. The apparatus as claimed in claim 28, wherein the equipment enclosure is a box-shaped housing, the support structure is a rack, the equipment is telecommunications equipment and the signal carrying cable is a fiber optic cable.

30. The apparatus as claimed in claim 29, wherein the bridging member is a web.

31. The apparatus as claimed in claim 30, wherein each cable retaining member is a tongue.

32. The apparatus as claimed in claim 31, wherein the first abutting member has a key-shaped aperture therein.

33. The apparatus as claimed in claim 32, wherein the apparatus is constructed from sheet metal.

34. The apparatus as claimed in claim 32, wherein the apparatus is constructed from a plastic.

35. The apparatus as claimed in claim 33, wherein the web is uniformly five inches wide.

36. The apparatus as claimed in claim 35, wherein the tongues have a planar portion; and one of said tongues is disposed adjacent the arcuate surface, and an edge of said one of said tongues proximate to said arcuate surface has an angled flange which extends away from the web at an obtuse angle with respect to the planar portion.

37. A bend radius control apparatus for a signal carrying cable, the signal carrying cable being connectable to equipment housed in an enclosure therefor, the enclosure providing an edge thereof around which said cable is to be redirected as to its orientation, the bend radius control apparatus comprising: an elongate member having a generally U-shaped cross-sectional configuration with free terminal ends and an apex portion located therebetween, the apex portion presenting a predetermined radius of curvature; and at least one guide, said guide protruding from a surface of the elongate member; wherein the signal carrying cable, when said member is attached adjacent said edge of the enclosure, contacts said member and said guide instead of said edge at the apex portion of the member to thereby cause redirection of the orientation of the signal carrying cable while maintaining the signal carrying cable at a bend radius which is no less than said predetermined radius of curvature.

38. The bend radius control apparatus as claimed in claim 37, wherein the predetermined radius of curvature is at least one inch.

39. The bend radius control apparatus as claimed in claim 38, wherein the apex portion of the elongate member is generally parallel to said edge of the enclosure, and a free terminal end of the elongate member is attached to said edge.

40. (Amended) The bend radius control apparatus as claimed in claim 39, wherein said apparatus comprises two guides, each said guide protruding from a surface of the elongate member at a location proximate to the point at which said member is attached to the edge of the enclosure, the guides each having a curved surface that is perpendicular to the exterior surface of the elongate member, the curved surface forming at least a 90 degree arc with a radius of at least one inch, the guides being oriented in mirror relationship to one another with the curved surfaces thereof facing each other, the guides thereby defining boundaries of a channel for the signal carrying cable when same is placed therebetween, the channel being widest at a point where the signal carrying cable exits the channel adjacent the apex portion of the bend radius control apparatus.

41. The ben d radius control apparatus as claimed in claim 40, wherein the apparatus is constructed from sheet metal.

42. The bend radius control apparatus as claimed in claim 40, wherein the apparatus is constructed from a plastic.

43. The bend radius control apparatus as claimed in claim 41, wherein the equipment enclosure is a box-shaped housing and the equipment is telecommunications equipment.

44. The bend radius control apparatus as claimed in claim 43, wherein the signal carrying cable is a fiber optic cable.

45. The bend radius control apparatus as claimed in claim 44, wherein the elongate member is of a such length that a plurality of fiber optic cables, aligned in side by side relationship to one another, may each contact and traverse the periphery of the elongate member.

\* \* \* \* \*

UNITED STATES PATENT AND TRADEMARK OFFICE
CERTIFICATE OF CORRECTION

PATENT NO. : 6,504,094 B2
DATED : January 7, 2003
INVENTOR(S) : Raymond Woo et al.

It is certified that error appears in the above-identified patent and that said Letters Patent is hereby corrected as shown below:

Column 5,
Line 63, "12" should be -- 32 --.

Column 6,
Line 55, "48" should be deleted.

Column 9,
Line 53, "at the" (second occurrence) should be deleted.

Column 10,
Lines 48 and 51, "48" should be deleted.

Column 11,
Line 50, "gap." should be -- gap; --.

Column 12,
Line 37, after "securing", insert -- said at least one --.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,504,094 B2             Page 1 of 1
DATED         : January 7, 2003
INVENTOR(S)   : Raymond Woo et al.

It is certified that error appears in the above-identified patent and that said Letters Patent is hereby corrected as shown below:

Column 15,
Line 1, "(Amended)" should be deleted.

Signed and Sealed this

Twenty-fifth Day of February, 2003

JAMES E. ROGAN
*Director of the United States Patent and Trademark Office*